(12) United States Patent
Kobayashi (10) Patent No.: US 9,407,177 B2
(45) Date of Patent: Aug. 2, 2016

(54) ROTATING ELECTRIC MACHINE CONTROL DEVICE AND ELECTRIC POWER STEERING APPARATUS

(71) Applicant: DENSO CORPORATION, Kariya, Aichi-pref. (JP)

(72) Inventor: Daisuke Kobayashi, Obu (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 14/182,309

(22) Filed: Feb. 18, 2014

(65) Prior Publication Data

US 2014/0265954 A1    Sep. 18, 2014

(30) Foreign Application Priority Data

Mar. 13, 2013 (JP) .................................. 2013-50422

(51) Int. Cl.
*H02P 6/00* (2016.01)
*H02P 21/00* (2016.01)
*B62D 5/04* (2006.01)

(52) U.S. Cl.
CPC ............... *H02P 6/002* (2013.01); *B62D 5/046* (2013.01); *B62D 5/0481* (2013.01)

(58) Field of Classification Search
USPC .................... 318/400.02, 430, 434, 400.22
See application file for complete search history.

(56) References Cited

U.S. PATENT DOCUMENTS

| | | | | |
|---|---|---|---|---|
| 8,723,461 B2 * | 5/2014 | Yoo | ..................... | H02P 21/0035 318/400.02 |
| 2004/0052097 A1 * | 3/2004 | Morimoto | ............. | H02P 27/047 363/55 |
| 2004/0104697 A1 | 6/2004 | Suzuki | | |
| 2004/0232865 A1 * | 11/2004 | Suzuki | ..................... | 318/400.21 |
| 2009/0079375 A1 * | 3/2009 | Suzuki | ................. | B62D 5/0481 318/434 |
| 2011/0156665 A1 * | 6/2011 | Chou | ...................... | G05F 1/575 323/234 |

FOREIGN PATENT DOCUMENTS

| | | |
|---|---|---|
| DE | 102 19 826 | 11/2003 |
| DE | 10 2008 019 570 | 10/2009 |
| JP | 2008-109846 | 5/2008 |

(Continued)

OTHER PUBLICATIONS

Office Action (5 pages) dated Jan. 29, 2015, issued in corresponding Japanese Application No. 2013-050422 and English translation (5 pages).

*Primary Examiner* — Paul Ip
*Assistant Examiner* — Said Bouziane
(74) *Attorney, Agent, or Firm* — Nixon & Vanderhye PC (57) ABSTRACT

In a rotating electric machine control device, a voltage command value calculation section calculates a voltage command value based on a current command value and a motor current. An inverter power estimation section estimates an inverter power based on the motor current. A power supply current estimation section estimates a power supply current based on the inverter power and a power supply voltage. A limit gain determination section determines a limit gain based on the power supply current and a target power supply current. A limited voltage command value calculation section calculates a limited voltage command value based on the voltage command value and the limit gain. A current limitation section is capable of limiting the power supply current by outputting a command value corresponding to the limited voltage command value to an inverter portion.

8 Claims, 4 Drawing Sheets

(56) References Cited

FOREIGN PATENT DOCUMENTS

| JP | 2008109846 A | * | 5/2008 | | |
|----|----|----|----|----|----|
| JP | 2009-046005 | | 3/2009 | | |
| JP | 2009-173179 | | 8/2009 | | |
| JP | 2009-296764 | | 12/2009 | | |
| JP | 2011-125134 | | 6/2011 | | |
| JP | 2011125134 A | * | 6/2011 | | |
| JP | 2013-038855 | | 2/2013 | | |
| JP | 2013038855 A | * | 2/2013 | | |
| WO | WO 2012126029 A2 | * | 9/2012 | ............. | H02P 21/00 |

* cited by examiner

FIG. 4

ROTATING ELECTRIC MACHINE CONTROL DEVICE AND ELECTRIC POWER STEERING APPARATUS

CROSS REFERENCE TO RELATED APPLICATIONS

The present application is based on and claims priority to Japanese Patent Application No. 2013-50422 filed on Mar. 13, 2013, the contents of which are incorporated in their entirety herein by reference.

TECHNICAL FIELD

The present disclosure relates to a rotating electric machine control device and an electric power steering apparatus including the rotating electric machine control device.

BACKGROUND

Conventionally, a rotating electric machine control device that limits a power supply current flowing from a power source to an inverter portion and controls driving of a rotating electric machine has been known. For example, a rotating electric machine control device disclosed in JP-A-2011-125134 restricts heat generation on a power supply path and breakdown of switching elements in an inverter portion by limiting a power supply current. In addition, the rotating electric machine control device disclosed in JP-A-2011-125134 is used as a control device of a rotating electric machine in an electric power steering system in a vehicle to restrict influence of consumption of excess current by the rotating electric machine to other systems in the vehicle.

The rotating electric machine control device disclosed in JP-A-2011-125134 calculates a motor voltage limit command value when limiting the power supply current. The motor voltage limit command value is calculated using a torque constant of the rotating electric machine and a motor resistance. The torque constant and the motor resistance change depending on individual difference of the rotating electric machine and an environmental temperature. Thus, the motor voltage limit command value may have a margin of error. If the motor voltage limit command value has a margin of error, an output of the rotating electric machine may be insufficient due to excess limit of the power supply current or an excess power supply current may flow due to insufficient limitation of the power supply current.

SUMMARY

An object of the present disclosure is to provide a rotating electric machine control device that can control driving of a rotating electric machine with stable limitation of a power supply current. Another object of the present disclosure is to provide an electric power steering apparatus including the rotating electric machine control device.

According to a first aspect of the present disclosure, a rotating electric machine control device is configured to control a rotating electric machine driven by electric power from a power source and includes an inverter portion, a power supply voltage detection section, a motor current detection section, and a control portion. The inverter portion converts the electric power from the power source and supplies the electric power after conversion to the rotating electric machine. The power supply voltage detection section detects a power supply voltage, which is a voltage applied from the power source to the inverter portion. The motor current detection section detects a motor current, which is electric current flowing from the inverter portion to the rotating electric machine. The control portion controls operation of the inverter portion to control driving of the rotating electric machine.

The control portion includes a voltage command value calculation section, an inverter power estimation section, a power supply current estimation section, a target power supply current determination section, a limit gain determination section, a limited voltage command value calculation section, and a current limitation section.

The voltage command value calculation section calculates a voltage command value, which is a command value of voltage to be applied from the inverter portion to the rotating electric machine to drive the rotating electric machine, based on a current command value, which is a command value of electric current to be supplied from the inverter portion to the rotating electric machine to drive the rotating electric machine, and the motor current detected by the motor current detection section.

The inverter power estimation section estimates an inverter power, which is the electric power supplied from the inverter portion to the rotating electric machine, based on the motor current detected by the motor current detection section. The power supply current estimation section estimates a power supply current, which is electric current flows from the power source to the inverter portion, based on the inverter power estimated by the inverter power estimation section and the power supply voltage detected by the power supply voltage detection section.

The target power supply current determination section determines a target power supply current which is a target value of the power supply current. The limit gain determination section determines a limit gain based on the power supply current estimated by the power supply current estimation section and the target power supply current determined by the target power supply current determination section.

The limited voltage command value calculation section calculates a limited voltage command value, which is the voltage command value after limitation, based on the voltage command value calculated by the voltage command value calculation section and the limit gain determined by the limit gain determination section. The current limitation section is capable of limiting the power supply current by outputting a command value corresponding to the limited voltage command value calculated by the limited voltage command value calculation section to the inverter portion.

In the rotating electric machine control device, the limit gain is determined based on the detection values of the power supply voltage and the motor current and the values estimated or calculated by the control portion. Thus, the limit gain is not influenced by an individual difference of the rotating electric machine and an environmental temperature. As a result, the rotating electric machine control device can solve problems that an output of the rotating electric machine is insufficient due to excess limit of the power supply current or an excess power supply current flows due to insufficient limitation of the power supply current. Therefore, the rotating electric machine control device can control the driving of the rotating electric machine with stable limitation of the power supply current.

According to a second aspect of the present disclosure, an electric power steering apparatus includes the rotating electric machine control device according to the first aspect and the rotating electric machine generating an assist torque for assisting a steering operation by a driver.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Rotating electric machine control devices according to the present disclosure will be described with reference to the accompanying drawings. In the following embodiments, components having similar structures are denoted by the same reference numeral and an explanation will be omitted.

(First Embodiment)

A rotating electric machine control device 1 according to a first embodiment of the present disclosure will be described with reference to FIG. 1. The rotating electric machine control device 1 controls driving of a motor 10 as a rotating electric machine. The rotating electric machine control device 1 can be used, for example, in an electric power steering apparatus that assists a steering operation of a vehicle.

Figure 2:
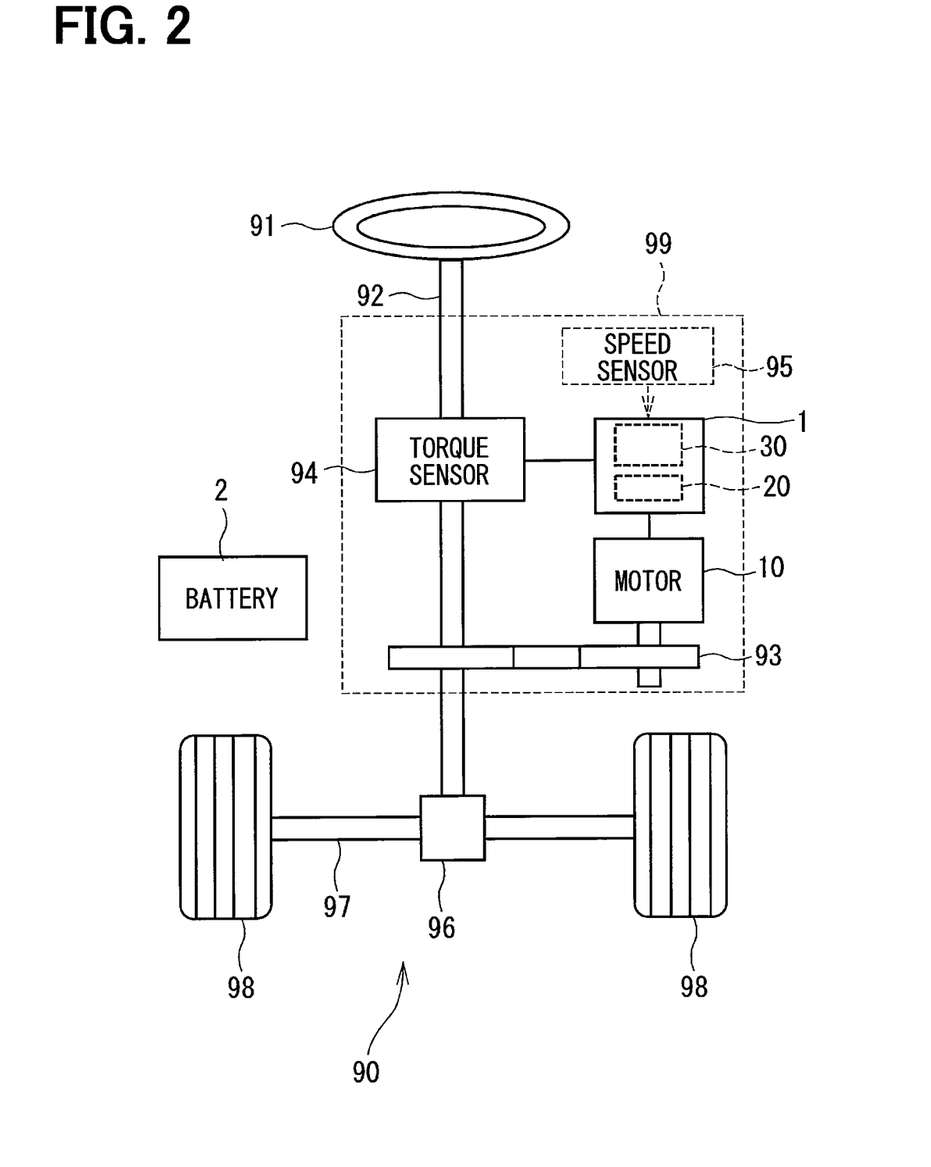
FIG. 2 is a diagram showing an electric power steering apparatus to which the rotating electric machine control device according to the first embodiment is applied.

FIG. 2 is a diagram showing a steering system 90 including an electric power steering apparatus 99. The electric power steering apparatus 99 includes a torque sensor 94. The torque sensor 94 is attached to a steering shaft 92 connected to a steering wheel 91. The torque sensor 94 detects a steering torque that is input by a driver to the steering shaft 92 via the steering wheel 91.

At an end of the steering shaft 92, a pinion gear 96 is attached. The pinion gear 96 engages with a rack shaft 97. At ends of the rack shaft 97, a pair of wheels 98 is rotatably connected, for example, via tie rods. Accordingly, when the driver rotates the steering wheel 91, the steering shaft 92 connected to the steering wheel 91 rotates. The pinion gear 96 converts a rotational movement of the steering shaft 92 into a linear movement of the rack shaft 97. The wheels 98 rotate at angles depending on the linear displacement of the rack shaft 97.

The electric power steering apparatus 99 includes the motor 10, the rotating electric machine control device 1, and a deceleration gear 93. The motor 10 generates a steering assist torque. The rotating electric machine control device 1 controls driving of the motor 10. The motor 10 rotates the deceleration gear 93 in a forward direction or a backward direction. The electric power steering apparatus 99 also includes the torque sensor 94 and a speed sensor 95 that detects a vehicle speed. By the above-described configuration, the electric power steering apparatus 99 generates the steering assist torque for assisting a steering operation of the steering wheel 91 from the motor 10 and transfers to the steering shaft 92.

The motor 10 is a three-phase brushless motor. The motor 10 is driven by electric power from a battery 2 as a power source. The motor 10 includes a rotor and a stator, which are not shown. The rotor is a disc-shaped member. The rotor is attached with a permanent magnet on a surface or inside of the rotor and has magnetic poles. The rotor is housed in the stator and is rotatably held. The stator has protruding portions protruding inward and disposed at every predetermined angle. A coil 11, a coil 12, and a coil 13 shown in FIG. 1 are respectively wound around the protruding portions. The coil 11, the coil 12, and the coil 13 respectively correspond to a U-phase, a V-phase, and a W-phase of the motor 10. The motor 10 is attached with a position sensor 14 that detects a rotation position $\theta$ of the rotor.

Figure 1:
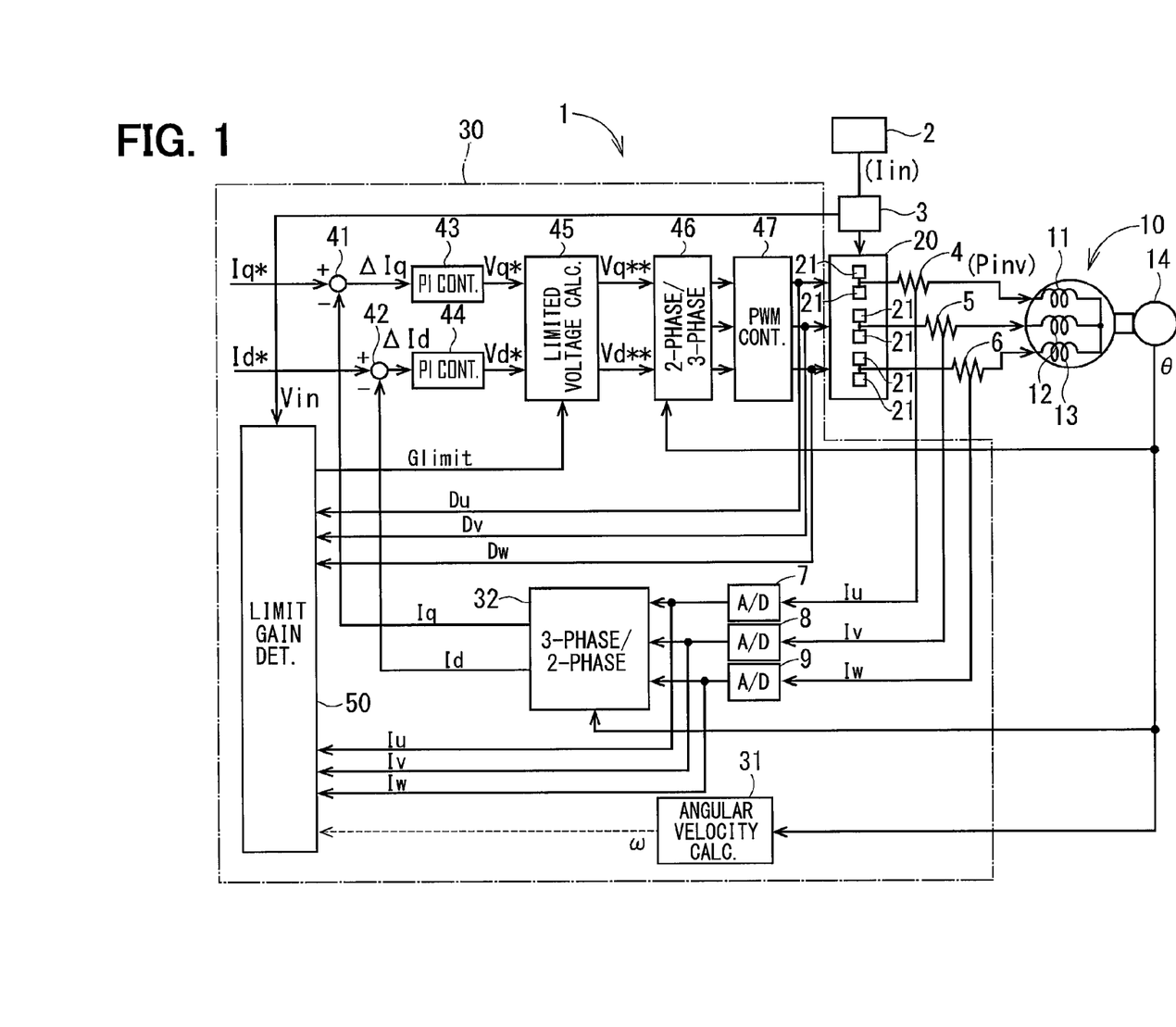
FIG. 1 is a diagram showing a rotating electric machine control device according to a first embodiment of the present disclosure.

As shown in FIG. 1, the rotating electric machine control device 1 includes an inverter portion 20, a voltage sensor 3, current sensors 4, 5, 6, and a control portion 30. The voltage sensor 3 can operate as a power supply voltage detection section. The current sensors 4, 5, 6 can operate as a motor current detection section. The inverter portion 20 is a three-phase inverter and includes six switching elements 21. In the present embodiment, each of the switching elements 21 is a metal-oxide-semiconductor field-effect transistor (MOSFET), which is a kind of a field-effect transistor. Two switching elements 21 form a first switching element pair (arm), other two switching elements 21 form a second switching element pair, and the other two switching elements 21 form a third switching element pair. The first switching element pair is connected to the coil 11. The second switching element pair is connected to the coil 12. The third switching element pair is connected to the coil 13. The three switching element pairs are connected to the battery 2. In the inverter portion 20, operations of the switching elements 21 are controlled by the control portion 30. The inverter portion 20 converts electric power from the battery 2 and supplies to the motor 10.

The voltage sensor 3 is disposed between the battery 2 and the inverter portion 20. The voltage sensor 3 can detect a power supply voltage Vin, which is a voltage applied from the battery 2 to the inverter portion 20. Each of the current sensors 4, 5, 6 is, for example, a shunt resistor. The current sensor 4 is disposed between the first switching element pair and the coil 11. The current sensor 5 is disposed between the second switching element pair and the coil 12. The current sensor 6 is disposed between the third switching element pair and the coil 13. When electric current flows from the inverter portion 20 to the motor 10, a U-phase current Iu flowing to the coil 11 flows through the current sensor 4, a V-phase current Iv flowing to the coil 12 flows through the current sensor 5, and a W-phase current Iw flowing to the coil 13 flows through the current sensor 6. Accordingly, the current sensors 4, 5, 6 can respectively detect the U-phase current Iu, the V-phase current Iv, and the W-phase current Iw as motor currents.

The control portion 30 manages the whole control of the rotating electric machine control device 1. The control portion 30 may include a microcomputer, a register, and a driving circuit, which are not shown. The control portion 30 includes A/D converters (A/D) 7, 8, 9, a rotation angular velocity calculation portion (ANGULAR VELOCITY CALC.) 31, a three-phase/two-phase coordinate conversion portion (3-PHASE/2-PHASE) 32, subtractors 41, 42, PI control portions (PI CONT.) 43, 44, a limited voltage command value calculation portion (LIMITED VOLTAGE CALC.) 45, a two-phase/three-phase coordinate conversion portion (2-PHASE/3-PHASE) 46, a PWM controller (PWM CONT.) 47, and a limit gain determination portion (LIMIT GAIN DET.) 50. The A/D converters 7, 8, 9 may be physical components. The rotation angular velocity calculation portion 31, the three-phase/two-phase coordinate conversion portion 32, the subtractors 41, 42, the PI control portions 43, 44, the limited voltage command value calculation portion 45, the two-phase/three-phase coordinate conversion portion 46, the PWM controller 47, and the limit gain determination portion 50 may be software components or hardware components.

The A/D converter 7 receives an output value of the current sensor 4, that is, an analog value of the U-phase current Iu, converters the analog value to a digital value, and outputs the digital value of the U-phase current Iu. The A/D converter 8 receives an output value of the current sensor 5, that is, an analog value of the V-phase current Iv, converters the analog value to a digital value, and outputs the digital value of the V-phase current Iv. The A/D converter 9 receives an output value of the current sensor 6, that is, an analog value of the W-phase current Iw, converters the analog value to a digital value, and outputs the digital value of the W-phase current Iw. The rotation angular velocity calculation portion 31 calculates a rotation angular velocity ω of the motor 10 based on the rotation position θ detected by the position sensor 14.

The control portion 30 calculates a q-axis current command value Iq* and a d-axis current command value Id* based on the rotation angular velocity ω of the motor 10 calculated by the rotation angular velocity calculation portion 31, the steering torque detected by the torque sensor 94, and the vehicle speed detected by the vehicle speed sensor 95. The three-phase/two-phase coordinate conversion portion 32 converts the digital values of the U-phase current Iu, the V-phase current Iv, and the W-phase current Iw, which are converted by the A/D converters 7, 8, 9, from a three-phase alternating current coordinate into a q-axis current detection value Iq and a d-axis current detection value Id in a d-q coordinate based on the rotation position θ detected by the position sensor 14.

The subtractor 41 receives the q-axis current command value Iq* and the q-axis current detection value Iq and transmits a q-axis current deviation ΔIq, which is a difference between the q-axis current command value Iq* and the q-axis current detection value Iq, to the PI control portion 43. The subtractor 42 receives the d-axis current command value Id* and the d-axis current detection value Id and transmits a d-axis current deviation ΔId, which is a difference between the d-axis current command value Id* and the d-axis current detection value Id, to the PI control portion 44.

Based on the q-axis current deviation ΔIq transmitted from the subtractor 41, the PI control portion 43 performs a feedback control so that the q-axis current detection value Iq as the actual current follows the q-axis current command value Iq*. Specifically, the PI control portion 43 multiplies the q-axis current deviation ΔIq by a predetermined PI gain to calculate a q-axis voltage command value Vq*, which is a command value of a q-axis voltage to be applied from the inverter portion 20 to the motor 10 to drive the motor 10. The PI control portion 43 transmits the q-axis voltage command value Vq* to the limited voltage command value calculation portion 45.

Based on the d-axis current deviation ΔId transmitted from the subtractor 42, the PI control portion 44 performs a feedback control so that the d-axis current detection value Id as the actual current follows the d-axis current command value Id*. Specifically, the PI control portion 44 multiplies the d-axis current deviation ΔId by a predetermined PI gain to calculate a d-axis voltage command value Vd*, which is a command value of a q-axis voltage to be applied from the inverter portion 20 to the motor to drive the motor 10. The PI control portion 44 transmits the d-axis voltage command value Vd* to the limited voltage command value calculation portion 45.

The subtractors 41, 42 and the PI control portion 43, 44 can operate as a voltage command value calculation section.

The limited voltage command value calculation portion 45 calculates a limited q-axis voltage command value Vq**, which is a q-axis voltage command value after limitation, based on the q-axis voltage command value Vq* transmitted from the PI control portion 43 and a limit gain Glimit described later. The limited voltage command value calculation portion 45 transmits the limited q-axis voltage command value Vq to the two-phase/three-phase coordinate conversion portion 46. Specifically, the limited voltage command value calculation portion 45 calculates the limited q-axis voltage command value Vq by multiplying the q-axis voltage command value Vq* by the limit gain Glimit as expressed by Equation (1).

$$Vq^{**}=Vq^{*}\times Glimit \quad (1)$$

In addition, the limited voltage command value calculation portion 45 calculates a limited d-axis voltage command value Vd**, which is a d-axis voltage command value after limitation, based on the d-axis voltage command value Vd* transmitted from the PI control portion 44 and the limit gain Glimit. The limited voltage command value calculation portion 45 transmits the limited d-axis voltage command value Vd to the two-phase/three-phase coordinate conversion portion 46. Specifically, the limited voltage command value calculation portion 45 calculates the limited d-axis voltage command value Vd by multiplying the d-axis voltage command value Vd* by the limit gain Glimit as expressed by Equation (2).

$$Vd^{**}=Vd^{*}\times Glimit \quad (2)$$

The limited voltage command value calculation portion 45 can operate as a limited voltage command value calculation section.

The two-phase/three-phase coordinate conversion portion 46 converts the limited q-axis voltage command value Vq and the limited d-axis voltage command value Vd transmitted from the limited voltage command value calculation portion 45 into a U-phase voltage command value Vu*, a V-phase voltage command value Vv*, and a W-phase voltage command value Vw* based on the rotation position η detected by the position sensor 14. The two-phase/three-phase coordinate conversion portion 46 transmits the U-phase voltage command value Vu*, the V-phase voltage command value Vv*, and the W-phase voltage command value Vw* to the PWM controller 47.

The PWM controller 47 calculates a U-phase duty command value Du, a V-phase duty command value Dv, and a W-phase duty command value Dw corresponding to duty ratios in a on-period of the respective switching elements 21 based on the U-phase voltage command value Vu*, the V-phase voltage command value Vv*, and the W-phase voltage command value Vw* transmitted from the two-phase/three-phase conversion portion 46. The PWM controller 47 transmits the U-phase duty command value Du, the V-phase duty command value Dv, and the W-phase duty command value Dw to the inverter portion 20. The PWM controller 47 can operate as a duty command value calculation section.

The inverter portion 20 controls on-off states of the respective switching elements 21 on the basis the U-phase duty command value Du, the V-phase duty command value Dv, and the W-phase duty command value Dw transmitted from the PWM controller 47. Accordingly, voltages corresponding to the U-phase duty command value Du, the V-phase duty command value Dv, and the W-phase duty command value Dw are applied to the coil 11, the coil 12, and the coil 13, respectively, and the electric current (motor current) flows from the battery 2 to the motor 10 through the inverter portion 20. As a result, the motor 10 rotates, and the motor 10 outputs the steering assist torque. In this way, the PWM controller 47 performs a pulse width modulation (PWM) control of the motor 10 through the inverter portion.

Next, an exemplary way of determining the limit gain Glimit by the limit gain determination portion 50 will be described. The limit gain determination portion 50 determines the limit gain Glimit by performing a series of first through fourth steps. The limit gain determination portion 50 repeats the series of first through fourth steps with a predetermined period and determines the limit gain Glimit each time.

In the first step, the limit gain determination portion 50 estimates an inverter power Pinv, which is electric power supplied from the inverter portion 20 to the motor 10, based on the U-phase current Iu, the V-phase current Iv, the W-phase current Iw detected by the current sensors 4, 5, 6, respectively (i.e., the U-phase Iu, the V-phase current Iv, the W-phase current Iw converted into the digital values by the A/D converters 7, 8, 9, respectively). More specifically, the limit gain determination portion 50 estimates the inverter power Pinv using Equation (3) based on the power supply voltage Vin detected by the voltage sensor 3, the U-phase duty command value Du, the V-phase duty command value Dv, and the W-phase duty command value Dw calculated by the PWM controller 47, and the U-phase current Iu, the V-phase current Iv, and the W-phase current Iw converted into the digital values by the A/D converters 7, 8, 9, respectively.

$$Pinv = Vin \times (Du/100) \times Iu + Vin \times (Dv/100) \times Iv + Vin \times (Dw/100) \times Iw \quad (3)$$

In the present step, the limit gain determination portion 50 can operate as an inverter power estimation section.

In the second step, the limit gain determination portion 50 estimates a power supply current Iin, which is electric current flowing from the battery 2 to the inverter portion 20, using Equation (4) based on the inverter power Pinv estimated in the first step and the power supply voltage Vin detected by the voltage sensor 3.

$$Iin = Pinv/Vin \quad (4)$$

In the present step, the limit gain determination portion 50 can operate as a power supply current estimation section.

In the third step, the limit gain determination portion 50 determines a target power supply current Iin*, which is a target value of the power supply current Iin. In the present embodiment, the limit gain sets the target power supply current Iin* at a predetermined value (A). In the present step, the limit gain determination portion 50 can operate as a power supply current determination section.

In the fourth step, the limit gain determination portion 50 determines the limit gain Glimit based on the power supply current Iin estimated in the second step and the target power supply current Iin* determined in the third step. More specifically, the limit gain determination portion 50 determines the limit gain Glimit using Equation (5) based on the limit gain Glimit(n−1) determined in the previous fourth step, the power supply current Iin, and the target power supply current Iin*.

$$Glimit(n) = Glimit(n-1) \times Iin*/Iin \quad (5)$$

In Equation (5), Glimit(n) expresses the present value and Glimit(n−1) expresses the previous value. In the present step, the limit gain determination portion 50 can operate as a limit gain determination section. The limit gain determination portion 50 performs a guard procedure such that the limit gain Glimit(n) becomes 1 at the maximum.

The limit gain determination portion 50 determines the limit gain Glimit by the above-described way. When the limit gain determination portion 50 determines the limit gain Glimit, the limit gain determination portion 50 transmits the limit gain Glimit to the limited voltage command value calculation portion 45. As described above, the limited voltage command value calculation portion 45 calculates the limited q-axis voltage command value Vq and the limited d-axis voltage command value Vd based on the q-axis voltage command value Vq*, the d-axis voltage command value Vd* and the limit gain Glimit and transmits the limited q-axis voltage command value Vq and the limited d-axis voltage command value Vd to the two-phase/three-phase coordinate conversion portion 46.

The two-phase/three-phase coordinate conversion portion 46 converts the limited q-axis voltage command value Vq and the limited d-axis voltage command value Vd into the U-phase voltage command value Vu*, the V-phase voltage command value Vv*, and the W-phase voltage command value Vw*. The two-phase/three-phase coordinate conversion portion 46 transmits the U-phase voltage command value Vu*, the V-phase voltage command value Vv*, and the W-phase voltage command value Vw* to the PWM controller 47. The PWM controller 47 calculates the U-phase duty command value Du, the V-phase duty command value Dv, and the W-phase duty command value Dw based on the U-phase voltage command value Vu*, the V-phase voltage command value Vv*, and the W-phase voltage command value Vw* and transmits the U-phase duty command value Du, the V-phase duty command value Dv, the W-phase duty command value Dw to the inverter portion 20.

The inverter portion 20 applies the voltages corresponding to the U-phase duty command value Du, the V-phase duty command value Dv, the W-phase duty command value Dw to the coil 11, the coil 12, and the coil 13, respectively, based on the U-phase duty command value Du, the V-phase duty command value Dv, and the W-phase duty command value Dw. Accordingly, electric current (motor current) flows from the battery 2 to the motor 10 through the inverter portion 20. The power supply current Iin that flows from the battery 2 to the inverter portion 20 is limited based on the limit gain Glimit (the limited q-axis voltage command value Vq and the limited d-axis voltage command value Vd). Accordingly, the rotating electric machine control device 1 can restrict heat generation on the power supply path and breakdown of the switching elements 21 in the inverter portion 20. The two-phase/three-phase conversion portion 46 and the PWM controller 47 can operate as a current limitation section.

As described above, in the present embodiment, when the limit gain Glimit for limiting the power supply current Iin is determined, values depending on an individual difference of the motor 10 and an environmental temperature, such as a torque constant (Kt) and a motor resistance (R) are unnecessary. The limit gain Glimit is determined based on the detection values of the power supply voltage Vin and the motor current Iu, Iv, Iw and the values estimated or calculated by the control portion 30. Accordingly, the limit gain Glimit is not influenced by the individual difference of the motor 10 and the environmental temperature. As a result, the rotating electric machine control device 1 can solve problems that an output of the rotating electric machine is insufficient due to excess limit of the power supply current or an excess power supply current flows due to insufficient limitation of the power supply current. Therefore, the rotating electric machine control device 1 according to the present embodiment can control the driving of the motor 10 with stable limitation of the power supply current Iin.

In addition, in the present embodiment, the motor 10 includes the coil 11, the coil 12, and the coil 13 corresponding to a plurality of phases (the U-phase, the V-phase, and the W-phase. The inverter portion 20 includes the switching elements 21 corresponding to the coil 11, the coil 12, and the coil 13. When the control portion 30 operates as the duty command value calculation section, the control portion 30 calculates the duty command values Du, Dv, Dw corresponding to the duty ratios in the on-period of the switching elements 21 for the respective phases. In addition, when the control portion 30 operate as the inverter power estimation section, the control portion 30 estimates the inverter power Pinv based on the power supply voltage Vin detected by the voltage sensor 3, the calculated duty command values Du, Dv, Dw of the respective phases, and the motor currents Iu, Iv, Iw detected by the current sensors 4, 5, 6, respectively. The above description is one exemplary way of estimating the inverter power Pinv.

Furthermore, when the control portion 30 operate as the limited voltage command value calculation section, the control portion 30 calculates the limited q-axis voltage command value Vq and the limited d-axis voltage command value Vd with respect to the q-axis voltage command value Vq* and the d-axis voltage command value Vd*, respectively. Accordingly, the control portion 30 can limit both of a q-axis component and a d-axis component of the power supply line Iin.

The control portion 30 repeatedly performs the processes as the inverter power estimation section, the power supply current estimation section, the target power supply determination section, the limit gain determination section, the limited voltage command value generation section, and the current limitation section with the predetermined period to limit the power supply current Iin flowing from the battery 2 to the inverter portion 20 with the predetermined period. In the electric power steering apparatus 99, a large current may suddenly flow to the motor 10 depending on the steering operation of the steering wheel 91 by the driver. The rotating electric machine control device 1 determines the limit gain Glimit and limits the power supply current Iin with a relatively short period. Thus, the rotating electric machine control device 1 can be suitably used for driving the motor 10 of the electric power steering apparatus 99 with limiting the power supply current Iin flowing to the inverter portion 20.

(Second Embodiment)

Figure 3:
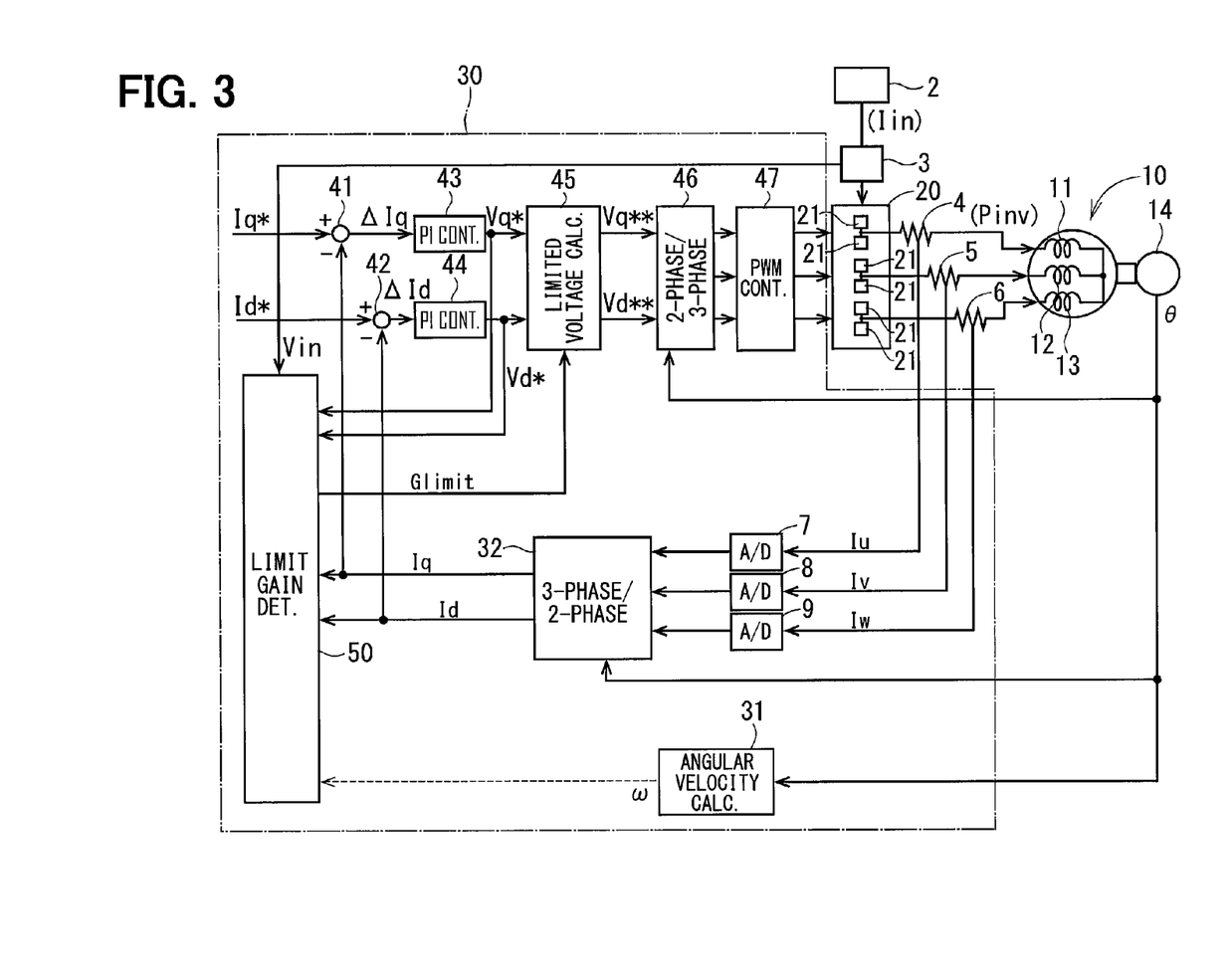
FIG. 3 is a diagram showing a rotating electric machine control device according to a second embodiment of the present disclosure.

A rotating electric machine control device according to a second embodiment of the present disclosure will be described with reference to FIG. 3. The rotating electric machine control device according to the present embodiment has a physical configuration similar to the rotating electric machine control device according to the first embodiment. However, the limit gain determination portion 50 according to the present embodiment determines the limit gain Glimit in a manner different from the first embodiment.

In the present embodiment, the limit gain determination portion 50 determines the limit gain Glimit through a series of first though fourth steps described below. Also in the present embodiment, the limit gain determination portion 50 repeats the series of first through fourth steps with a predetermined period and determines the limit gain Glimit each time.

In the first step, the limit gain determination portion 50 estimates an inverter power Pinv, which is electric power supplied from the inverter portion 20 to the motor 10, based on the U-phase current Iu, the V-phase current Iv, and the W-phase current Iw detected by the current sensors 4, 5, 6, respectively (i.e., the U-phase Iu, the V-phase current Iv, and the W-phase current Iw converted into the digital values by the A/D converters 7, 8, 9, respectively). More specifically, the limit gain determination portion 50 estimates the inverter power Pinv using Equation (6) based on the q-axis voltage command value Vq* and the d-axis voltage command value Vd* detected by the PI control portion 43 and the PI control portion 44 and the q-axis current detection value Iq and the d-axis current detection value Id converted by the three-phase/two-phase coordinate conversion portion 32 from the U-phase current Iu, the V-phase current Iv, and the W-phase current Iw.

$$Pinv = Vq^* \times Iq + Vd^* \times Id \tag{6}$$

In the present step, the limit gain determination portion can operate as an inverter power estimation section.

In the second step, the limit gain determination portion 50 estimates a power supply current Iin, which is electric current flowing from the battery 2 to the inverter portion 20, using Equation (7) based on the inverter power Pinv estimated in the first step and the power supply voltage Vin detected by the voltage sensor 3.

$$Iin = Pinv / Vin \tag{7}$$

In the present step, the limit gain determination portion 50 can operate as a power supply current estimation section.

In the third step, the limit gain determination portion 50 determines a target power supply current Iin*, which is a target value of the power supply current Iin. In the present embodiment, the limit gain determination portion 50 determines the target power supply current Iin, for example, based on a map M shown in FIG. 4. The map M shows a correspondence relationship between the power supply voltage Vin and the target power supply current Iin*. The target power supply current Iin*(A) increases with increase in the power supply voltage Vin (v). In the present step, the limit gain determination portion 50 can operate as a target power supply current determination section.

In the fourth step, the limit gain determination portion 50 determines the limit gain Glimit based on the power supply current Iin estimated in the second step and the target power supply current Iin* determined in the third step. More specifically, the limit gain determination portion 50 determines the limit gain Glimit by passing a value that is calculated based on the limit gain Glimit(n−1) determined in the previous fourth step, the power supply current Iin, and the target power supply current Iin* through a low pass filter (LPF) as expressed by Equation (8).

$$Glimit(n) = LPF(Glimit(n-1) \times Iin^* / Iin) \tag{8}$$

The limit gain determination portion 50 performs a guard procedure such that the limit gain Glimit(n) becomes 1 at the maximum. In the present step, the limit gain determination portion 50 can operate as a limit gain determination section.

The limit gain determination portion 50 according to the present embodiment determines the limit gain Glimit by the above-described way. When the limit gain determination portion 50 determines the limit gain Glimit, the limit gain determination portion 50 transmits the limit gain Glimit to the limited voltage command value calculation portion 45.

The limited voltage command value calculation portion 45 calculates the limited q-axis voltage command value Vq and the limited d-axis voltage command value Vd using Equation (9) and Equation (10) based on the q-axis voltage command value Vq*, the d-axis voltage command value Vd* and the limit gain Glimit and transmits the limited q-axis voltage command value Vq and the limited d-axis voltage command value Vd to the two-phase/three-phase coordinate conversion portion 46.

$$Vq^{**} = Vq^* \quad (9)$$

$$Vd^{**} = Vd^* \times Glimit \quad (10)$$

In this way, in the present embodiment, the limited q-axis voltage command value Vq** is set to the q-axis voltage command value Vq* without processing, and the limited d-axis voltage command value Vd** is set to a value calculated by multiplying the d-axis voltage command value Vd* by the limit gain Glimit. In other words, the limited voltage command value (the limited d-axis voltage command value Vd**) is calculated with respect to only the d-axis voltage. Accordingly, only the d-axis component in the power supply current Iin is limited.

As described above, in the present embodiment, when the limit gain Glimit for limiting the power supply current Iin is determined, values depending on an individual difference of the motor 10 and an environmental temperature, such as a torque constant (Kt) and a motor resistance (R) are unnecessary. The limit gain Glimit is determined based on the detection values of the power supply voltage Vin and the motor current Iu, Iv, Iw and the values estimated or calculated by the control portion 30. Accordingly, the limit gain Glimit is not influenced by the individual difference of the motor 10 and the environmental temperature. Therefore, the rotating electric machine control device according to the present embodiment can control the driving of the motor 10 with stable limitation of the power supply current Iin in a manner similar to the first embodiment.

In the present embodiment, when the control portion 30 operates as the inverter power estimation section, the control portion 30 estimates the inverter power Pinv based on the calculated q-axis voltage command value Vq* and the d-axis voltage command value Vd* and the motor currents Iu, Iv, Iw detected by the current sensors 4, 5, 6, respectively (the q-axis current detection value Iq and the d-axis current detection value Id). The above description is one exemplary way of estimating the inverter power Pinv.

Figure 4:
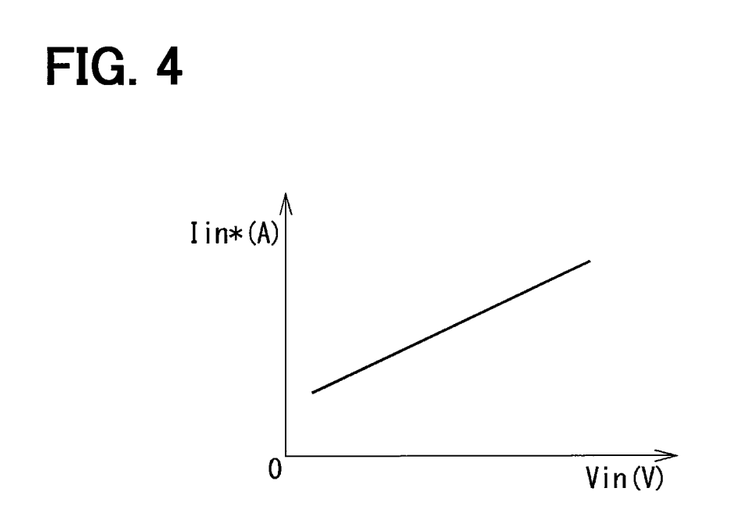
FIG. 4 is a diagram showing a map that is used when the rotating electric machine according to the second embodiment determines a target power supply current.

In addition, when the control portion 30 operates as the target power supply current determination section, the control portion 30 determines the target power supply current Iin* based on the map M that indicates the correspondence relationship between the power supply voltage Vin and the target power supply current Iin. In the present embodiment, the target power supply current Iin*(A) is increased with increase in the power supply voltage Vin (V). Accordingly, the power supply current Iin can be limited in accordance with the power supply Vin. For example, the limitation of the power supply current Iin is eased with increase in the power supply voltage Vin.

When the control portion 30 operates as the limit gain determination section, the control portion 30 sets to the limit gain Glimit to a value passing through the low pass filter that is a filter limiting a predetermined band of an input signal. Accordingly, the control portion 30 can restrict hunting when the power supply current Iin is limited.

In addition, when the control portion 30 operates as the limited voltage command value calculation section, the control portion 30 calculates the limited d-axis voltage command value Vd** with respect to the d-axis voltage command value Vd*. Accordingly, only the d-axis component in the power supply current Iin is limited. Because the rotating electric machine control device according to the present embodiment limits the d-axis current that contributes to the rotation of the motor 10, the rotating electric machine control device is suitable when a torque of the motor 10 is important.

(Other Embodiments)

Unless there is hindrance, parts of the components in the above-described embodiments can be combined. For example, in the first embodiment, the target power supply current may be determined based on a map, or the limited gain may be set to a value passing through a filter.

In another embodiment, the target power supply current may be determined based on a calculation formula not limited to the map. In another embodiment, the limited voltage command value may be calculated only to the q-axis voltage command value. In the present case, only the q-axis component in the power supply current is limited. Thus, a rotating electric machine according to the present embodiment is suitable when rotation of a rotating electric machine is important.

In another embodiment, a rotating electric machine may be multiple-phase rotating electric machine other than three-phase. The rotating electric machine control devices according to the present disclosure may be used as control devices of rotating electric machines not limited the rotating electric machine in the electric power steering apparatus.

While the present disclosure has been described with reference to the foregoing embodiments, it is to be understood that the disclosure is not limited to the embodiments and constructions. The present disclosure is intended to cover various modification and equivalent arrangements.

What is claimed is:

1. A rotating electric machine control device configured to control a rotating electric machine driven by electric power from a power source, the rotating electric machine control device comprising:
    an inverter portion converting the electric power from the power source and supplying the electric power after conversion to the rotating electric machine;
    a power supply voltage detection section detecting a power supply voltage which is a voltage applied from the power source to the inverter portion;
    a motor current detection section detecting a motor current which is electric current flowing from the inverter portion to the rotating electric machine;
    a control portion controlling operation of the inverter portion to control driving of the rotating electric machine,
    wherein the control portion includes a voltage command value calculation section, an inverter power estimation section, a power supply current estimation section, a target power supply current determination section, a limit gain determination section, a limited voltage command value calculation section, and a current limitation section,
    wherein the voltage command value calculation section calculates a voltage command value, which is a command value of voltage to be applied from the inverter portion to the rotating electric machine to drive the rotating electric machine, based on a current command value, which is a command value of electric current to be supplied from the inverter portion to the rotating electric machine to drive the rotating electric machine, and the motor current detected by the motor current detection section,
    wherein the inverter power estimation section estimates an inverter power, which is the electric power supplied from the inverter portion to the rotating electric machine, based on the motor current detected by the motor current detection section,
    wherein the power supply current estimation section estimates a power supply current, which is electric current flows from the power source to the inverter portion, based on the inverter power estimated by the inverter power estimation section and the power supply voltage detected by the power supply voltage detection section, wherein the target power supply current determination section determines a target power supply current which is a target value of the power supply current, wherein the limit gain determination section determines a present value of limit gain based on the power supply current estimated by the power supply current estimation section, the target power supply current determined by the target power supply current determination section, and a previous value of limit gain, wherein the limited voltage command value calculation section calculates a limited voltage command value, which is the voltage command value after limitation, based on the voltage command value calculated by the voltage command value calculation section and the limit gain determined by the limit gain determination section, and wherein the current limitation section is capable of limiting the power supply current by outputting a command value corresponding to the limited voltage command value calculated by the limited voltage command value calculation section to the inverter portion.

2. The rotating electric machine control device according to claim 1, wherein the rotating electric machine includes a plurality of windings corresponding to a plurality of phases, wherein the inverter portion includes a plurality of switching elements corresponding to the respective phases, wherein the control portion includes a duty command value calculation section calculating duty command values corresponding to duty ratios in an on-period of the switching elements of the respective phases, and wherein the inverter power estimation section estimates the inverter power based on the power supply voltage detected by the power supply voltage detection section, the duty command values of the respective phases calculated by the duty command value calculation section, and the motor current detected by the motor current detection section.

3. The rotating electric machine control device according to claim 1, wherein the inverter power estimation section estimates the inverter power based on the voltage command value calculated by the voltage command value calculation section and the motor current detected by the motor current detection section.

4. The rotating electric machine control device according to claim 1, wherein the target power supply current determination section determines the target power supply current based on the map indicating a correspondence relationship between the power supply voltage and the target power supply current.

5. The rotating electric machine control device according to claim 1, wherein the limit gain determination section determines a value that passes through a filter limiting a predetermined band of an input signal as the limit gain.

6. The rotating electric machine control device according to claim 1, wherein the limited voltage command value calculation section calculates the limited voltage command value with respect to at least one of a q-axis voltage command value and a d-axis voltage command value in the voltage command value.

7. The rotating electric machine control device according to claim 1, wherein the control portion repeats processes by the inverter power estimation section, the power supply current estimation section, the target power supply current determination section, the limit gain determination section, the limited voltage command value calculation section, and the current limitation section with a predetermined period.

8. An electric power steering apparatus comprising:

the rotating electric machine control device according to claim 1; and the rotating electric machine generating an assist torque for assisting a steering operation by a driver.

* * * * *